United States Patent
Yoon

(10) Patent No.: US 8,481,193 B2
(45) Date of Patent: Jul. 9, 2013

(54) BATTERY MODULE AND METHOD OF MANUFACTURING THE SAME

(75) Inventor: Ji-Hyoung Yoon, Yongin-si (KR)

(73) Assignee: Samsung SDI Co., Ltd., Suwon-Si (KR)

( * ) Notice: Subject to any disclaimer, the term of this patent is extended or adjusted under 35 U.S.C. 154(b) by 1284 days.

(21) Appl. No.: 11/950,451

(22) Filed: Dec. 5, 2007

(65) Prior Publication Data

US 2008/0220326 A1  Sep. 11, 2008

(30) Foreign Application Priority Data

Mar. 8, 2007 (KR) .......................... 10-2007-0023105

(51) Int. Cl.
*H01M 2/26* (2006.01)
*H01M 4/82* (2006.01)
*B23P 19/00* (2006.01)

(52) U.S. Cl.
USPC .......................... 429/121; 29/623.1; 29/426.1

(58) Field of Classification Search
USPC .......................................... 429/121; 29/623.1
See application file for complete search history.

(56) References Cited

U.S. PATENT DOCUMENTS

| 6,174,618 B1 * | 1/2001 | Nishiyama et al. | 429/99 |
| 6,392,172 B1 * | 5/2002 | Azema | 200/61.08 |
| 6,819,081 B2 * | 11/2004 | Izawa et al. | 320/107 |

FOREIGN PATENT DOCUMENTS

| JP | 11-120976 | 4/1999 |
| JP | 2003-242951 | 8/2003 |
| KR | 2006-118112 | 11/2006 |

OTHER PUBLICATIONS

Notice of Decision to Grant a Patent for Korean Patent Application No. 2007-23105 dated Nov. 14, 2008.

* cited by examiner

*Primary Examiner* — Karie O'Neill Apicella
(74) *Attorney, Agent, or Firm* — Christie, Parker & Hale, LLP

(57) ABSTRACT

A battery module ensuring task safety during assembly or repair of the battery module by blocking current. The battery module includes: i) at least one first battery, each first battery having an end portion connected to an anode terminal and at least one second battery, each second battery having an end portion connected to a cathode terminal wherein the anode terminals and the cathode terminals are made of elastic materials; ii) at least one connection member for electrically connecting adjacent anode and cathode terminals; iii) a first pack case having battery-containing portions in which the batteries are contained and connection member mounting portions on which the connection members are mounted; and iv) a second pack case which is coupled with the first pack case. The anode and cathode terminals are pressed by the second pack case so as to be in contact with the respective connection members.

19 Claims, 9 Drawing Sheets

BATTERY MODULE AND METHOD OF MANUFACTURING THE SAME

CROSS-REFERENCE TO RELATED APPLICATION

This application claims the benefit of Korean Application No. 2007-23105, filed Mar. 8, 2007 in the Korean Intellectual Property Office, the disclosure of which is incorporated herein by reference.

BACKGROUND OF THE INVENTION

1. Field of the Invention

Aspects of the present invention relate to a battery module and a method of manufacturing the same, and more particularly, to ensuring safety during the assembly process or other handling processes for a battery module 2. Description of the Related Art In general, several or even tens of rechargeable batteries can be connected to form a battery module. A rechargeable battery is a battery that has the capacity for repeated charge and discharge cycles through reversible conversion between chemical energy and electrical energy. Recently, a large number of portable wireless electronic products have been developed. In order to reduce the size and weight of these products, demands for a rechargeable battery having high energy density have increased.

Examples of widely used rechargeable batteries include nickel-cadmium, nickel-hydrogen, and lithium secondary batteries. In particular, a lithium secondary battery has an operating voltage of 3.6 V or more, which is three times as high as that of a nickel-cadmium battery or a nickel-hydrogen battery. Furthermore, the lithium secondary battery market as a power source for portable electronic devices is growing rapidly because of the battery's high energy density per unit weight.

A typical rechargeable battery includes an electrode assembly in which a separator is disposed between an anode and a cathode, a can shaped to contain the electrode assembly, and a cap assembly coupled with the can to close and seal the can. A rechargeable battery may be manufactured in various shapes depending on the shapes of the electrode assembly and the can. For example, a rechargeable battery may have a cylindrical shape, a prismatic shape, or a pouch shape.

Battery modules constructed with interconnected rechargeable batteries have been widely used as power sources for small-sized portable electronic devices (cellular phones, personal computers and camcorders, etc.) as well as motor-driving power source for hybrid electric vehicles.

A battery module has a structure where the electrically connected rechargeable batteries are disposed in a pack case. The manufacturing processes for such a battery module include a process for electrically connecting the rechargeable batteries with the connection members and a process of disposing the connected rechargeable batteries in the pack case. Therefore, disposing the electrically-connected rechargeable batteries in the pack case involves multiple operations.

However, when the assembly process for connecting and securing the electrically connected rechargeable batteries in the pack case is carried out, task safety cannot be ensured. In other words, since the task is performed in a state of current flow, task safety cannot be ensured because of the current.

In addition, when an existing battery module is repaired, the rechargeable batteries are disassembled from a state in which the rechargeable batteries are electrically connected, so task safety again cannot be ensured.

The information disclosed in this Background section is only for enhancement of understanding of the invention; therefore it may contain information that is prior art that is already known in this country to a person of ordinary skill in the art.

SUMMARY OF THE INVENTION

Aspects of the present invention provide a battery module and a method of manufacturing the battery module having the advantages of ensuring task safety by blocking the current in the assembly process or repair process for the battery module.

An aspect of the present invention provides a battery module including: i) a plurality of batteries including at least one first battery, each battery having an end portion connected to an anode terminal and at least one second battery, each battery having an end portion connected to a cathode terminal; ii) at least one connection member for electrically connecting an anode terminal to a cathode terminal; and iii) a pack case having a plurality of first (or lower) battery-containing portions in which the batteries are contained and at least one first connection member mounting portion, wherein a connection member is mounted in each first connection member mounting portion, and wherein the anode terminal of each first battery and the cathode terminal of each second battery are made of an elastic material.

The anode and cathode terminals may be disposed to be separated from the connection members. Each first connection member mounting portion may be provided in the lower pack case and be formed along opposite edges of the lower pack case, that is, at the ends of the lower battery containing portions.

The battery module may further comprise a second (or upper) pack case that can be coupled with the lower pack case. The upper pack case also may have a plurality of second or upper battery-containing portions in which the plurality of batteries is also contained. Accordingly, when the anode terminals and the cathode terminals at the ends of the first battery containing portions are pressed between the upper and lower pack cases, each cathode and anode pair comes in contact with a corresponding connection member.

The thickness of each connection member may be less than the depth of the corresponding first connection member mounting portion. The sum of the thickness of each connection member and the thickness of each anode terminal or the sum of the thickness of each connection member and the thickness of each cathode terminal may be equal to or greater than the depth of the corresponding first connection member mounting portion.

Each anode terminal may include a first portion that is fixed to an end of the corresponding first battery and a second portion that protrudes from an edge of the first portion to extend in the perpendicular direction thereof, and each cathode terminal may include a first portion that is fixed to an end of the corresponding second battery and a second portion that protrudes from an edge of the first portion to extend in the perpendicular direction thereof.

The anode terminal and the cathode terminal may be made of a material selected from the group consisting of stainless steel, an aluminum alloy, acrylonitrile-butadiene-styrene (ABS) resin, polycarbonate (PC) resin, polypropylene (PP) resin, polybutylene terephthalate (PBT) resin, and a combination thereof.

In another embodiment of the present invention, each first connection member mounting portion is formed only along a first edge of the lower pack case. The upper pack case may have a plurality of second (or upper) battery-containing portions in which the plurality of batteries is contained and at least one second connection member mounting portion. A connection member is mounted in each of the first and second connection member mounting portions. Each second connection member mounting portion may be formed along a second edge of the upper pack case, and when the upper pack case is coupled with the lower pack case, the second edge is coupled with a third edge of the lower pack case, which is opposite to the first edge of the lower pack case. As with the first embodiment summarized above, when the anode terminals and the cathode terminals at the ends of the first and second battery containing portions are pressed between the upper and lower pack cases, each cathode and anode pair comes in contact with a corresponding connection member.

The anode terminals and the cathode terminals in the respective battery containing portions may be disposed in parallel to extend in the same direction. Thus, the first batteries and the second batteries may be connected in series. The plurality of batteries may be cylindrical rechargeable batteries. The height from the deepest position of the lower set of battery-containing portions (in the first embodiment) and both sets of battery containing portions to the tops of the connection members may be smaller than the radius of each of the batteries.

Another aspect of the present invention provides a method of manufacturing a battery module, including: i) forming a plurality of lower battery-containing portions and at least one connection member mounting portion in a lower pack case; ii) mounting a connection member in each connection member mounting portion; iii) disposing at least one battery in each lower battery-containing portion so that the rows or batteries are in series, so that alternating rows of batteries have cathode terminals and anode terminals facing in opposite directions, and so that the terminal formed in the battery at the end of each lower battery containing portion is separated from a connection member; and iv) contacting each pair of cathode and anode terminals at ends of the lower battery containing portions to a connection member by coupling an upper pack case with the lower pack case. The terminals may be anode terminals or cathode terminals. The terminals may be made of an elastic material.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
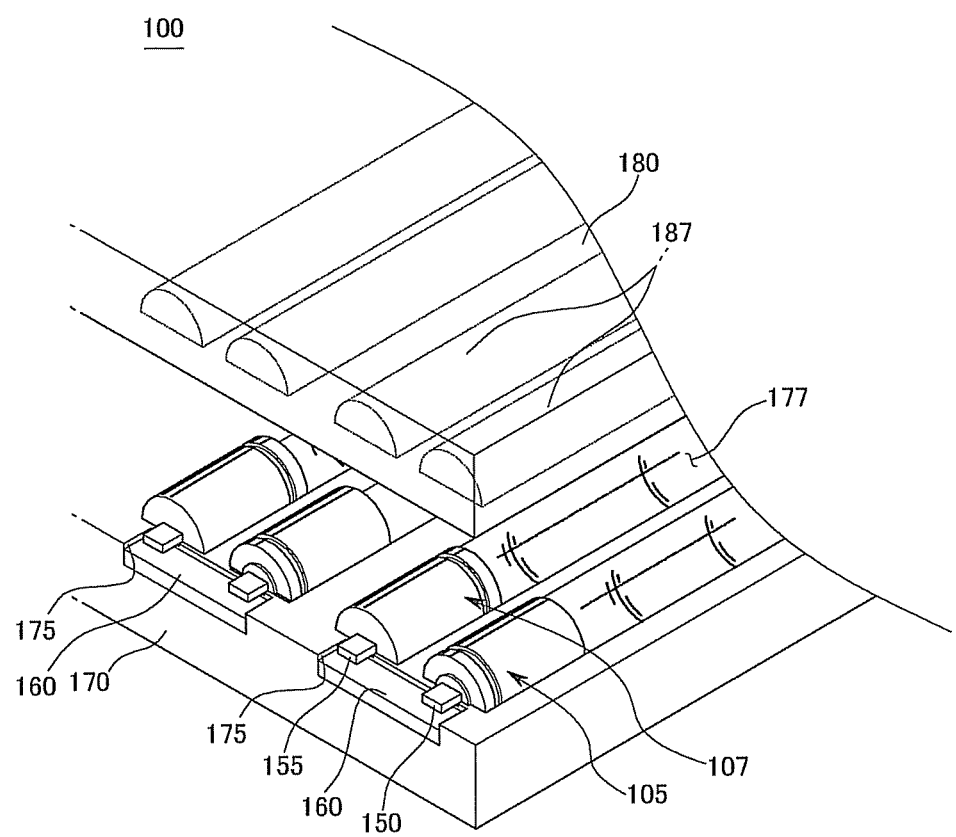
FIG. 1 is an exploded perspective view of a battery module according to a first embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2A:
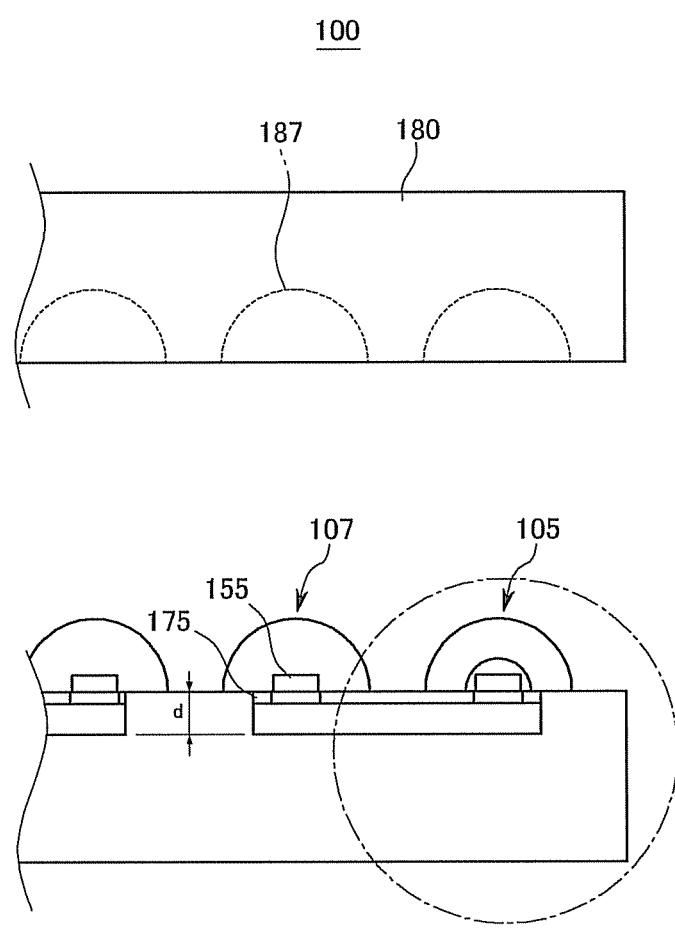
FIG. 2A is a front view of FIG. 1.
Figure 2B:
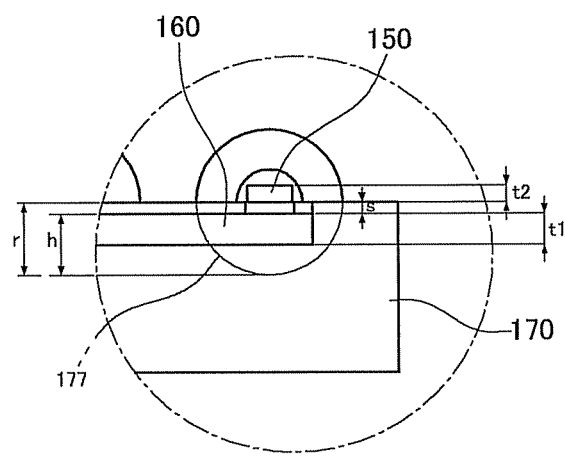
FIG. 2B is an enlarged view of the circled portion of FIG. 2A.

FIG. 1 is an exploded perspective view of a battery module 100 according to a first embodiment of the present invention, FIG. 2A is a front view of FIG. 1 and FIG. 2B is an enlarged view of the circled portion of FIG. 2A. In the accompanying drawings, for the better understanding and convenience of description, only some portions of the batteries (first and second rechargeable batteries 105 and 107, described further below) and accompanying structures are shown. At least one first rechargeable battery 105 and at least one second rechargeable battery 107 are disposed in a first pack case (hereinafter referred to as a lower pack case) 170 and a second pack case (hereinafter referred to as an upper pack case) 180. Each first battery having an anode terminal 150 that is in contact with a connection member 160 at the time of coupling the upper pack case 180 with the lower pack case 170 is referred to as a first rechargeable battery 105, and each second battery having a cathode terminal 155 that is in contact with the connection member is referred to as a second rechargeable battery 107. In this embodiment, the first and second rechargeable batteries 105 and 107 are lithium ion secondary batteries. However, a lithium ion secondary battery is an example for convenience of description, and the present invention is not limited to the battery module 100 described herein that is constructed with lithium ion secondary batteries. In addition, the first and second rechargeable batteries 105 and 107 may each be formed as a cylindrical rechargeable battery, a prismatic rechargeable battery, or a pouch-type rechargeable battery.

Referring to FIGS. 1, 2A and 2B, the battery module 100 principally includes at least one first rechargeable battery 105, at least one second rechargeable battery 107, at least one connection member 160 for electrically connecting the first rechargeable battery 105 to the second rechargeable battery 107, and the upper and lower pack cases 180 and 170 in which the first and second rechargeable batteries 105 and 107 are contained.

The lower pack case 170 has at least one first connection member mounting portion 175 on which a corresponding connection member 160 is mounted, and a plurality of first battery-containing portions 177 in which the first and second rechargeable batteries 105 and 107 are contained.

A plurality of first battery-containing portions 177 is formed in the lower pack case 170. A part of each first and second rechargeable battery 105 and 107 is contained in a first battery-containing portion 177, and the remaining part thereof is contained in a second battery-containing portion 187 formed in the upper pack case 180.

Each connection member mounting portion 175 is formed with a predetermined depth "d" along an edge of the lower pack case 170 facing the upper pack case 180. A connection member 160 is mounted in each connection member mounting portion 175. When the upper pack case 180 is coupled with the lower pack case 170, each connection member 160 comes into contact with a pair of anode and cathode terminals 150 and 155 at each end of the battery containing portions to electrically connect the plurality of rechargeable batteries.

A mechanism for electrically connecting the anode and cathode terminals 150 and 155 with the connection member 160 is now described in detail. First, the anode and cathode terminals 150 and 155 of the first and second rechargeable batteries 105 and 107 that are to be in contact with the same connection member 160 are disposed on end portions of adjacent first battery-containing portions 177 in parallel with each other in the same direction. At this time, the anode and cathode terminals 150 and 155 are disposed to be separated by a predetermined gap from the connection member 160.

Next, when the upper pack case 180 is coupled with the lower pack case 170, the anode and cathode terminals 150 and 155 are pressed by the upper pack case 180 to be in contact with the connection member 160. As a result, the first and second rechargeable batteries 105 and 107 that are contained in the adjacent battery-containing portions 177 are connected in series.

In the battery module according to this embodiment of the present invention, each pair of first and second rechargeable batteries 105 and 107 is constructed so the individual batteries of each pair are not electrically connected to each other before the upper pack case 180 is coupled with the lower pack case 170. If the rechargeable batteries are electrically connected to each other before the coupling of the upper pack case 180 with the lower pack case 170, task safety cannot be ensured during assembly or repair of the battery module because of current flow while the assembly or repair is taking place.

The thickness t1 of the connection member 160 is designed to be smaller than the depth "d" of the first connection member mounting portion 175. The anode and cathode terminals 150 and 155 of the first and second rechargeable batteries 105 and 107 are disposed to be separated by a predetermined gap "s" from the top of the connection member 160 before the coupling of the upper pack case 180 with the lower pack case 170. When the upper pack case 180 is coupled with the lower pack case 170, the anode and cathode terminals 150 and 155 are pressed by the upper pack case 180 to be in contact with the connection member 160. In order to prevent defective contact, the thickness t2 of the anode and cathode terminals 150 and 155 may be equal to or larger than the predetermined gap "s."

In addition, the height "h" from the deepest position of the first battery-containing portion 177 to the top of the connection member 160 is designed to be smaller than the radius "r" of the first rechargeable battery 105 and the second rechargeable battery 107. Alternatively, according to another design of the battery module 100, the height "h" from the deepest position of the first battery-containing portion 177 to the top of the connection member 160 may be designed to be equal to or larger than the radius "r" of the first rechargeable battery 105 and the second rechargeable battery 107.

Since the anode and cathode terminals 150 and 155 are made of an elastic material, when the upper pack case 180 is decoupled from the lower pack case 170, the anode and cathode terminals 150 and 155 can recover to the unconstrained positions because of the elastic force of the anode and cathode terminals 150 and 155. When the upper pack case 180 is decoupled from the lower pack case 170, each pair of anode and cathode terminals 150 and 155 is now separated from the respective connection member 160 by the predetermined gap "s," so that the plurality of rechargeable batteries can be electrically disconnected.

Figure 3:
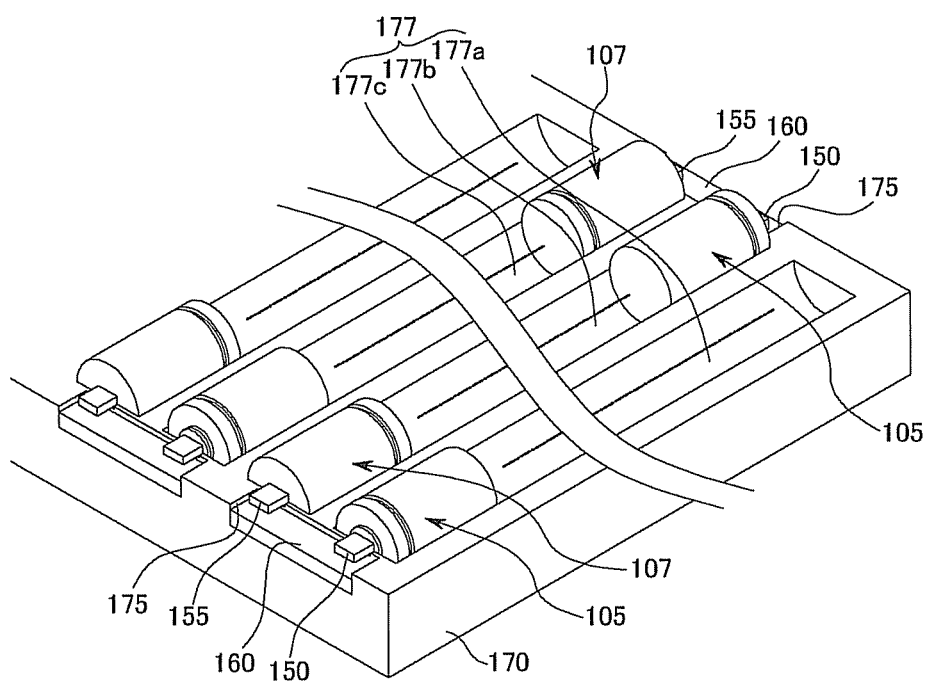
FIG. 3 is a perspective plan view of the lower pack case shown in FIG. 1.
Figure 4:
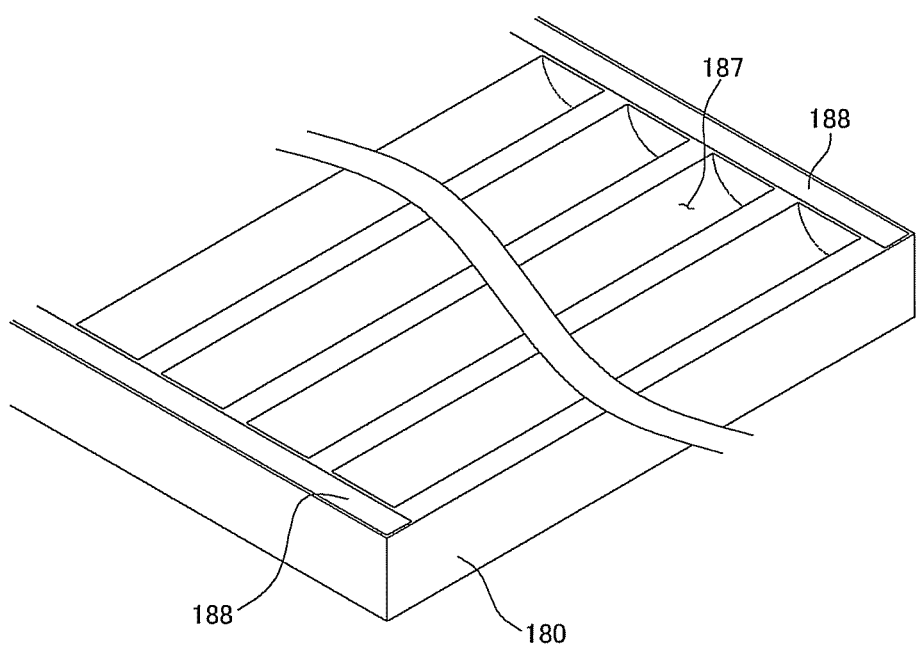
FIG. 4 is a perspective bottom view of the upper pack case shown in FIG. 1.

FIG. 3 is a perspective plan view of the lower pack case 170 shown in FIG. 1, and FIG. 4 is a perspective bottom view of the upper pack case 180 shown in FIG. 1. Referring to FIG. 3, a plurality of lower battery-containing portions 177 are arranged in one direction of the lower pack case 170. A plurality of rechargeable batteries including at least one first rechargeable battery 105 and at least one second rechargeable battery 107 are contained in the lower battery-containing portions 177.

The plurality of rechargeable batteries including each first and second rechargeable battery 105 and 107 is formed with the same structure. However, each first rechargeable battery 105 further includes the anode terminal 150 fixed on an electrode cap 143 (see FIG. 8), and each second rechargeable battery 107 further includes the cathode terminal 155 fixed on a can 120 (see FIG. 8).

Now, a structure in which the plurality of rechargeable batteries is disposed in the lower pack case 170 will be described. A second rechargeable battery 107 having a cathode terminal 155 is disposed in a first end portion of a second column 177b of the first battery-containing portion 177, and a first rechargeable battery 105 having an anode terminal 150 is disposed in a second end portion of the second column 177b of the first battery-containing portion 177.

In addition, the second rechargeable battery 107 disposed in the first end portion of the second column 177b of the first battery-containing portion 177 and the first rechargeable battery 105 disposed in the first end portion of the first column 177a of the first battery-containing portion 177 are electrically connected to each other with the same connection member 160. Further, the first rechargeable battery 105 disposed in the second end portion of the second column 177b of the first battery-containing portion 177 and the second rechargeable battery 107 disposed in the second end portion of the third column 177c of the first battery-containing portion 177 are electrically connected to each other with the same connection member 160.

A plurality of third rechargeable batteries (not shown) having no anode and cathode terminals 150 and 155 is disposed between the first and second rechargeable batteries 105 and 107 that are disposed in both end portions of a column, for example, the second column 177b of the first battery-containing portion 177. The plurality of third rechargeable batteries having no anode and cathode terminals 150 and 155 is electrically connected with inter-connectors (not shown). Because of such a connection structure, all the rechargeable batteries disposed in the lower pack case can be connected in series.

A plurality of the first connection member mounting portions 175 is formed in the lower pack case 170 to extend along opposite edges of the lower pack case 170. Each connection member 160 is mounted in a first connection member mounting portion 175. When the upper pack case 180 is coupled with the lower pack case 170, each of the connection members 160 is in contact with a corresponding anode terminal 150 and cathode terminal 155. Namely, a connection member 160 is in contact with the anode and cathode terminals 150 and 155 of the first and second rechargeable batteries 105 and 107 that are disposed in adjacent columns of the first battery-containing portions 177, so that the first and second rechargeable batteries 105 and 107 can be electrically connected to each other.

Referring to FIG. 4, a plurality of second battery-containing portions 187 in which the plurality of rechargeable batteries including the first and second rechargeable batteries 105 and 107 are contained is formed on the upper pack case 180 facing the lower pack case 170. In addition, attaching portions 188 are formed at corresponding ends of the second battery-containing portions 187 to be in contact with the anode and cathode terminals 150 and 155. The attaching portions 188 press each pair of anode and cathode terminals 150 and 155 to be in contact with the respective connection member 160 when the upper pack case 180 is coupled with lower pack case 170.

Figure 5:
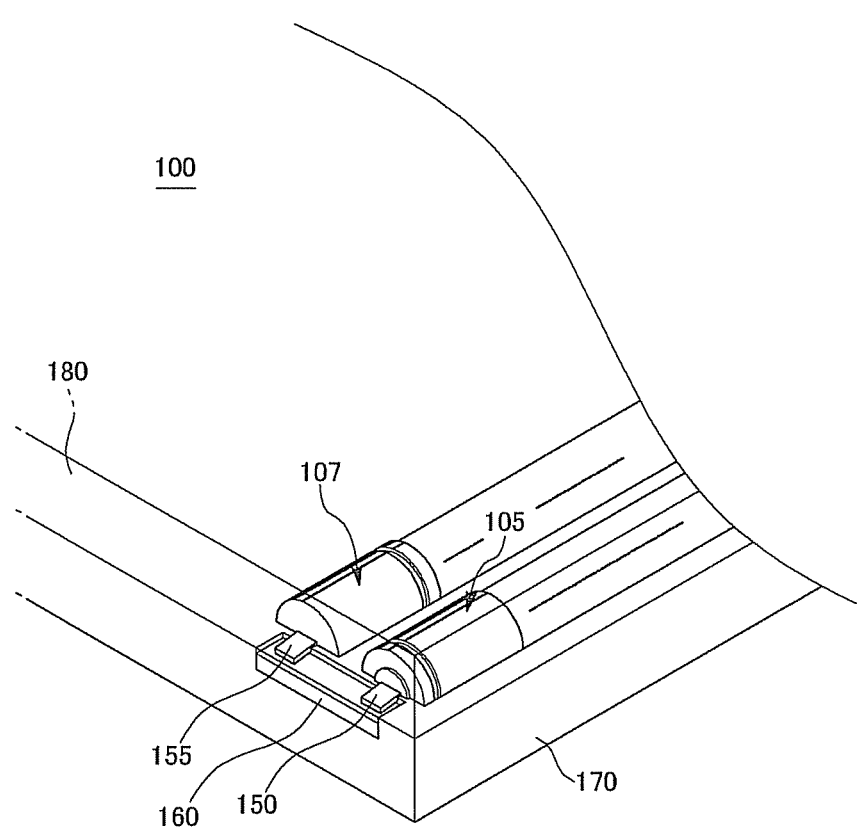
FIG. 5 is a schematic view illustrating the coupled state of the battery module of FIG. 1.

FIG. 5 is a schematic view illustrating the coupled state of the battery module 100 of FIG. 1. As shown in FIG. 5, the remaining (upper) portions of the first and second rechargeable batteries 105 and 107, which are not entirely contained in the first battery-containing portions 177 (see FIG. 1) of the lower pack case 170, are contained in the second battery-containing portions 187 (see FIG. 1) of the upper pack case 180. Each pair of anode and cathode terminals 150 and 155 is pressed by the attaching portion 188 (see FIG. 4) so as to be in contact with a connection member 160. When the upper pack case 180 is coupled with the lower pack case 170, the first rechargeable battery 105 and the second rechargeable battery 107 are then electrically connected.

In this embodiment, current flow is prevented until the upper pack case 180 is coupled with the lower pack case 170. Therefore, current related accidents can be prevented during the assembly process of the battery module 100.

The anode terminal 150 and the cathode terminal 155 may be made of an elastic material. For example, the anode and cathode terminals 150 and 155 may be made of a metal material such as stainless steel and an aluminum alloy and a plastic material such as ABS resin, PC resin, PP resin, and PBT resin.

In the converse of the assembly process described above, during the repair process for a battery module, when the upper pack case 180 of the battery module 100 is decoupled from the lower pack case 170, the anode and cathode terminals 150 and 155 of an adjacent pair of first and second rechargeable batteries 105 and 107 will disconnect from the connection member 160 because of the elastic force of the anode and cathode terminals 150 and 155 and the distance between the anode and cathode terminals 150 and 155 and the corresponding connection member 160 when the upper pack case 180 and lower pack case 170 are separate. As a result, current flow between the rechargeable batteries can be prevented, ensuring task safety during the repairing process.

Figure 6:
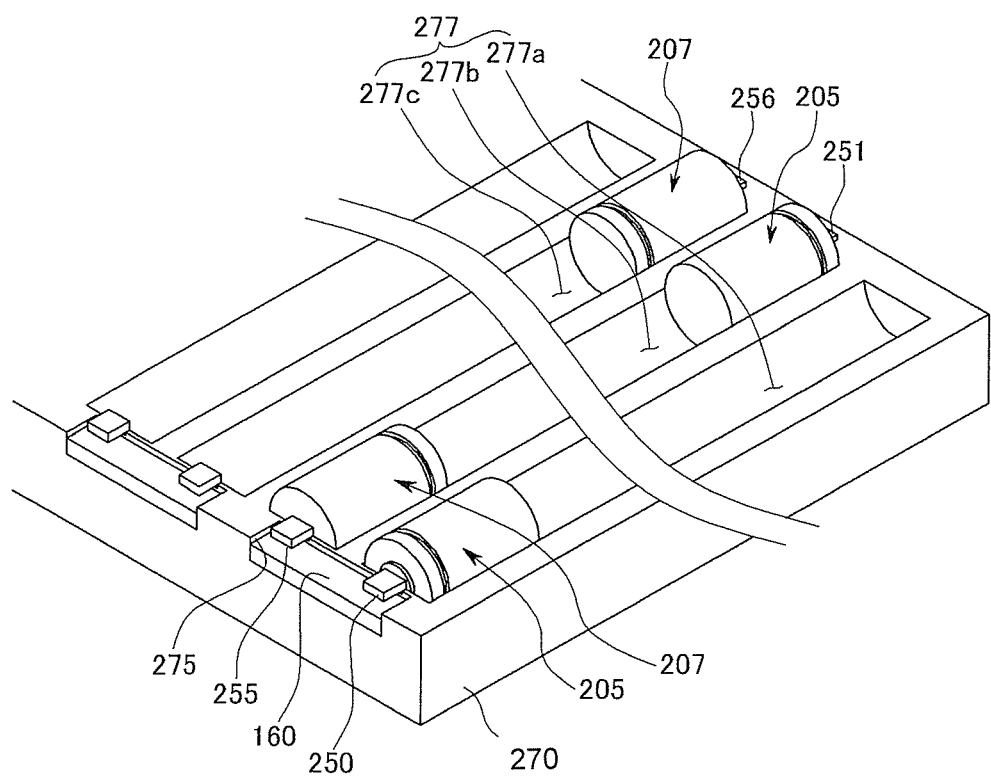
FIG. 6 is a perspective plan view of a lower pack case of a battery module according to a second embodiment of the present invention.
Figure 7:
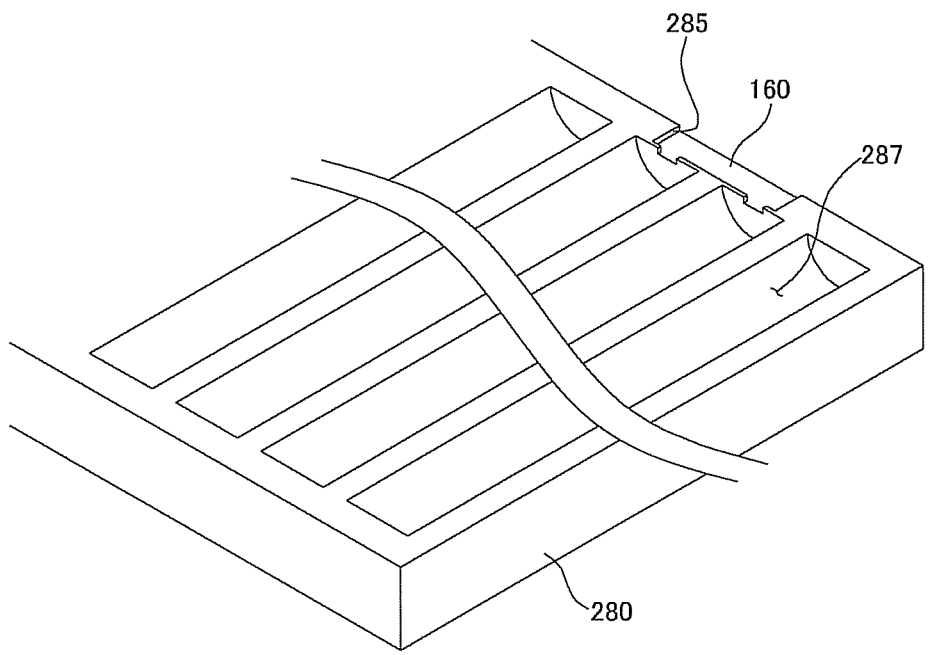
FIG. 7 is a perspective bottom view of an upper pack case of the battery module according to the second embodiment of the present invention.

FIG. 6 is a perspective plan view of a lower pack case 270 of a battery module according to a second embodiment of the present invention, and FIG. 7 is a perspective bottom view of an upper pack case 280 of the battery module according to the second embodiment of the present invention. Referring to FIGS. 6 and 7, a plurality of first battery-containing portions 277 and at least one first connection member mounting portion 275 are formed in the lower pack case 270, and a plurality of second battery-containing portions 287 and at least one second connection member mounting portion 285 are formed in the upper pack case 280. It should be noted that FIG. 7 is a bottom view of the upper pack case 280 such that each second connection member mounting portion 285 and the second upper battery containing portions 287 pictured in FIG. 7 oppose structures that are not pictured at the opposite end (left end) of FIG. 6. For convenience of illustration and discussion, they are shown at this end of the upper pack case 280.

Unlike the first embodiment, where no connection member mounting portion is formed in the upper pack case 180, in the second embodiment, at least one first connection member mounting portion 275 is formed in a first edge of the lower pack case 270 and at least one second connection member mounting portion 285 is formed in a second edge of the upper pack case 280. In this second embodiment, the first and second edges are at opposite ends of the first and second battery containing portions 277 and 278.

An anode terminal 250 of a first rechargeable battery 205 contained in a first column 277a of the first battery-containing portion 277 and a cathode terminal 255 of a second rechargeable battery 207 contained in a second column 277b of the first battery-containing portion 277 are in contact with the connection member 160 mounted on a first connection member mounting portion 275 formed in the first edge of the lower pack case 270.

A second connection member mounting portion 285 is formed in a second edge of the upper pack case 280 corresponding to end portions of a second column 277b of the first battery-containing portion 277 and a third column 277c of the first battery-containing portion 277 in a third edge opposite to the first edge of the lower pack case 270. The anode terminal 251 of the first rechargeable battery 205 disposed in the second column 277b of the first battery-containing portion 277 and the cathode terminal 256 of the second rechargeable battery 207 disposed in the third column 277c of the first battery-containing portion 277 are in contact with the connection member 160 mounted in the second connection member mounting portion 285.

The anode and cathode terminals 250 and 255 at the first edge of the lower pack case 270 are in contact with the respective connection member 160 in the lower pack case 270 only when the upper pack case 280 is coupled with the lower pack case 270.

Meanwhile, the second edge of the upper pack case 280 is in contact with the third edge opposite to the first edge of the lower pack case 270, i.e., at the opposite end of first battery containing portions 277. Now, the anode and cathode terminals 251 and 256 are pressed by the third edge of the lower pack case 270 in which the first connection member mounting portion 275 is not formed so as to be in contact with the corresponding connection member 160.

Similarly to the first embodiment, the anode terminals 250 and 251 and the cathode terminals 255 and 256 may be made of an elastic material. Accordingly, when the upper pack case 280 is decoupled from the lower pack case 270, the anode terminals 250 and 251 and the cathode terminals 255 and 256 are disconnected from the respective connection members 160 because of the elastic force of the anode terminals 250 and 251 and cathode terminals 255 and 256 so that there is a distance between the terminals (anode terminals 250 and 251 and cathode terminals 255 and 256) and the respective connection members 160 when the upper pack case 280 and lower pack case 270 are separate. As a result, current flow between the rechargeable batteries can be prevented, ensuring task safety during the repairing process.

Figure 8:
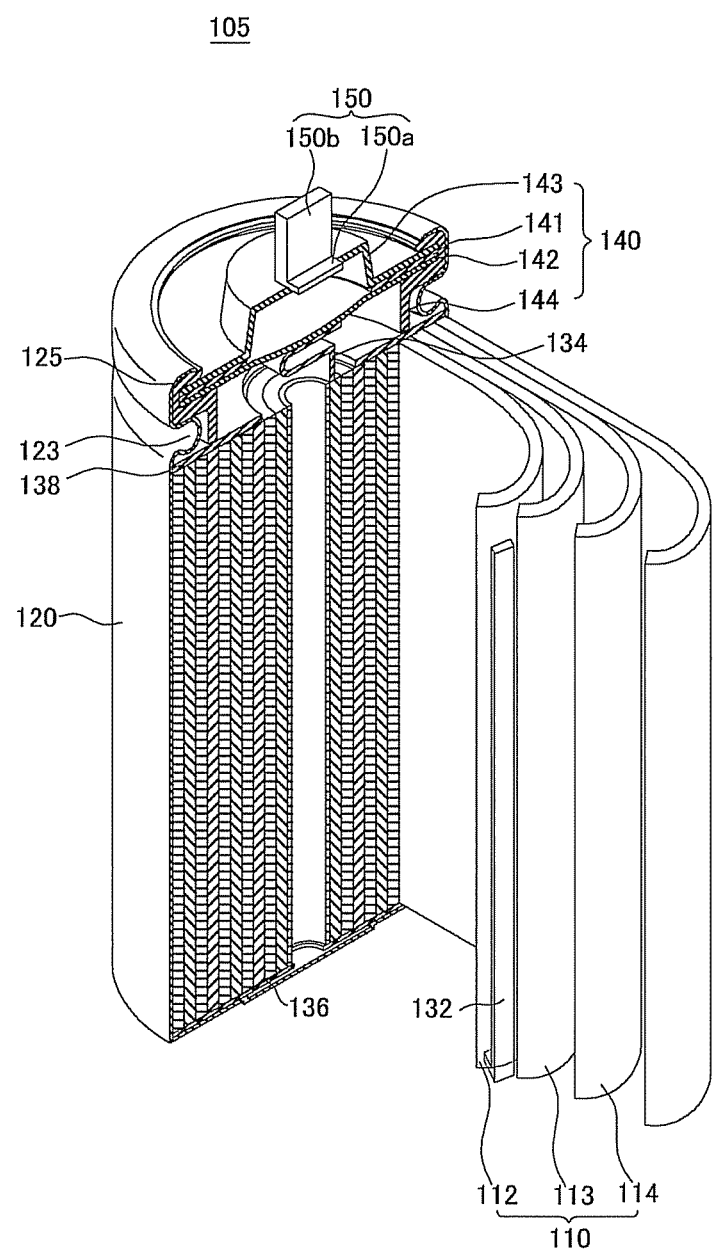
FIG. 8 is a perspective cross-sectional view of a rechargeable battery shown in FIG. 1.

Now, the structure of a rechargeable battery employed in the battery module according to the first embodiment is described in brief with reference to FIG. 8. A plurality of the rechargeable batteries is constructed with the same structure. However, each first rechargeable battery 105 and each second rechargeable battery 107 further include an anode terminal 150 and a cathode terminal 155, respectively. Since each first and second rechargeable battery 105 and 107 has the same structure except for the position of the terminal that is to be electrically connected to an anode or a cathode, a first rechargeable battery 105 is described in detail. It should also be noted that each first and second rechargeable battery 205 and 207 in the second embodiment has the same structure as those of each first and second rechargeable battery 105 and 107 of the first embodiment.

As shown in FIG. 8, each first rechargeable battery 105 of the battery module 100 primarily includes an electrode assembly 110, a can 120, and a cap assembly 140.

The electrode assembly 110 includes a cathode 112 with a cathode active material attached to a current-collecting plate, an anode 114 with an anode active material attached to a current-collecting plate, and a separator 113 interposed between the cathode 112 and the anode 114 to prevent a short circuit between the anode 114 and the cathode 112.

The cathode 112 is manufactured by coating a slurry-type active material layer, that is, a mixture of powder for the cathode active material, a cathode binder, and a coupling agent on the current-collecting plate such as a copper plate. A cathode tab 132 is coupled with the cathode 112. The cathode tab 132 comes in contact with an internal base of the can 120. Accordingly, the can 120 acts as a cathode terminal of the rechargeable battery.

The anode 114 is manufactured by uniformly coating a slurry-type active material layer, that is, a mixture of powder for the anode active material, an anode binder, and an anode conductive additive on the current-collecting plate such as an aluminum plate. An anode tab 134 is coupled with the anode 114. The anode tab 134 is drawn out from the anode 114 to come in contact with a safety vent 142.

Upper and lower insulating plates 138 and 136 are disposed at the upper and lower portions of the electrode assembly 110, respectively, so as to prevent a short circuit between the electrode assembly 110 and the can 120.

The can 120 has a substantially cylindrical shape and includes a space for containing the electrode assembly 110. The can 120 is made of a conductive metallic material such as aluminum, an aluminum alloy, or steel plated with nickel. The upper portion of the can 120 has an opening through which the electrode assembly 110 is inserted into the can 120.

The cap assembly 140 is coupled with the opening of the upper portion of the can 120 to close and seal the can 120. During the coupling of the cap assembly 140 with the can 120, a bead portion 123 and a crimping portion 125 are formed in the can 120.

In addition, an electrolyte solution (not shown) is injected into the can 120. Thus, lithium ions generated in an electrochemical reaction at the cathode 112 and the anode 114 during charging and discharging can be transferred.

The cap assembly 140 includes the electrode cap 143, the safety vent 142, a positive temperature coefficient element 141, and a gasket 144. The cap assembly 140 is disposed at the upper open portion of the can 120 to close and seal the can 120. In addition, an anode terminal 150 which is to be electrically connected to the connection member 160 (see FIG. 1) is provided at the outer surface of the electrode cap 143.

The gasket 144 is disposed between the can 120 and the positive temperature coefficient element 141 and safety vent 142 to surround the circumference of the positive temperature coefficient element 141 and safety vent 142 so as to insulate the positive temperature coefficient element 141 and the safety vent 142 from the can 120.

A lower side of the safety vent 142 is fixed to the anode tab 134, which has been drawn out from the anode 114, by welding or the like. When the internal pressure of the rechargeable battery 105 increases to exceed a predetermined pressure, the safety vent 142 deforms upward, and thus the safety vent 142 is electrically disconnected from the anode 114. The positive temperature coefficient element 141 is connected to the upper side of the safety vent 142. The positive temperature coefficient element 141 is a device where resistance increases nearly to infinity at a temperature exceeding the predetermined temperature. When the temperature of the rechargeable battery 105 exceeds the predetermined temperature, the flow of charging or discharging current can be stopped. In addition, when the temperature of the rechargeable battery 105 decreases below the predetermined temperature, the resistance of the positive temperature coefficient element 141 decreases again. Therefore, the functions of the rechargeable battery 105 are restored.

In addition to the aforementioned safety vent 142 and positive temperature coefficient element 141, additional safety devices for preventing overcharge, over-discharge, overheat, and abnormal current may be further provided to the rechargeable battery 105 employed in the battery module according to this embodiment.

The electrode cap 143 is disposed over the positive temperature coefficient element 141 for application of the current to an external circuit. The anode terminal 150 is disposed on the upper surface of the electrode cap 143. The anode terminal 150 includes a first portion 150a coupled with the electrode cap 143 and a second portion 150b formed to protrude from and perpendicular to the end of the first portion In a similar fashion, the cathode terminal 155 of each second rechargeable battery 107 is fixed to an end cap 143. The cathode terminal 155 includes a first portion coupled with the opening of the upper portion of the can 120 and a second portion formed to protrude from and perpendicular to the end of the first portion. In each second rechargeable battery, the anode is electrically connected to the can 120.

As described above, when the second portion 150b of the anode terminal 150 and the second portion of the cathode terminal 155 (see FIG. 5) are pressed by the upper pack case 180, the second portion 150b of the anode terminal 150 and the second portion of the cathode terminal 155 (see FIG. 5) are in contact with the connection member 160.

While the present invention has been particularly shown and described with reference to exemplary embodiments thereof, the exemplary embodiments should be considered in a descriptive sense only and not for purposes of limitation. Thus, it will be understood by those skilled in the art that various changes in form and details may be made therein without departing from the spirit and scope of the invention as defined by the appended claims.

According to aspects of the present invention, current does not flow until an upper pack case is coupled with a lower pack case, so that accidents can be prevented during assembly of a battery module.

In addition, according to aspects of the present invention, when an upper pack case of the battery module is decoupled from the lower pack case during repair of the battery module, terminals disconnect from their respective connection members. As a result, current flow between the rechargeable batteries can be prevented, so that task safety during repair can be ensured.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery module comprising:
one or more first batteries, each comprising an anode terminal at an end portion;
one or more second batteries, each comprising a cathode terminal at an end portion;

one or more connection members, each for electrically connecting the anode terminal of one of the first batteries to the cathode terminal of one of the second batteries; and a first pack case having:
 a plurality of first battery-containing portions for containing the first batteries and the second batteries; and
 one or more first connection member mounting portions, each for mounting one of the connection members,
wherein the anode terminal of each of the first batteries and the cathode terminal of each of the second batteries are made of an elastic material configured to
 bend from an unconstrained position to a constrained position when a force external to a corresponding one of the first and second batteries is applied to the elastic material, and
 relax from the constrained position to the unconstrained position when the external force is no longer applied to the elastic material, and
wherein the anode terminal of the one of the first batteries and the cathode terminal of the one of the second batteries are configured to electrically connect the one of the first batteries to the one of the second batteries when in the constrained positions and to electrically disconnect the one of the first batteries from the one of the second batteries when in the unconstrained positions.

2. The battery module of claim 1, wherein two of the first connection member mounting portions are disposed in opposite edges of the first pack case.

3. The battery module of claim 1, further comprising a second pack case for coupling with the first pack case and bending the anode terminal of each of the first batteries and the cathode terminal of each of the second batteries to the constrained positions, wherein each of the connection members is configured to make contact with the anode terminal of a corresponding one of the first batteries and the cathode terminal of a corresponding one of the second batteries when the second pack case is coupled with the first pack case.

4. The battery module of claim 3, wherein the second pack case has a plurality of second battery-containing portions for containing the first batteries and the second batteries.

5. The battery module of claim 1, wherein a thickness of each connection member of the connection members is less than a depth of a corresponding one of the first connection member mounting portions.

6. The battery module of claim 5, wherein the depth of the corresponding one of the first connection member mounting portions is equal to a sum of the thickness of the connection member and a thickness of the anode terminal of a corresponding one of the first batteries, and is equal to a sum of the thickness of the connection member and a thickness of the cathode terminal of a corresponding one of the second batteries.

7. The battery module of claim 5, wherein the depth of the corresponding one of the first connection member mounting portions is less than a sum of the thickness of the connection member and a thickness of the anode terminal of a corresponding one of the first batteries, and is less than a sum of the thickness of the connection member and a thickness of the cathode terminal of a corresponding one of the second batteries.

8. The battery module of claim 1, wherein
the anode terminal of each first battery of the first batteries includes a first portion that is fixed to an end of the first battery and a second portion that protrudes perpendicularly from an edge of the first portion, and
the cathode terminal of each second battery of the second batteries includes a first portion that is fixed to an end of the second battery and a second portion that protrudes perpendicularly from an edge of the first portion.

9. The battery module of claim 1, wherein the elastic material is made of a material selected from the group consisting of stainless steel, an aluminum alloy, ABS resin, PC resin, PP resin, PBT resin, and combinations thereof.

10. The battery module of claim 1, wherein each of the first connection member mounting portions is located along a first edge of the first pack case.

11. The battery module of claim 10, further comprising
a second pack case for coupling with the first pack case, wherein the second pack case has a plurality of second battery-containing portions for containing the first batteries and the second batteries, and
one or more second connection member mounting portions, each for mounting one of the connection members.

12. The battery module of claim 11, wherein
each of the second connection member mounting portions is located along a second edge of the second pack case,
the second edge of the second pack case faces a third edge of the first pack case when the second pack case is coupled with the first pack case, and
the third edge of the first pack case is opposite to the first edge of the first pack case.

13. The battery module of claim 12,
wherein each of the connection members is configured to make contact with the anode terminal of a corresponding one of the first batteries and the cathode terminal of a corresponding one of the second batteries when the second pack case is coupled with the first pack case, and
wherein the anode terminal of the corresponding one of the first batteries and the cathode terminal of the corresponding one of the second batteries are in the constrained positions when the second pack case is coupled with the first pack case.

14. The battery module of claim 1, wherein for each of the connection members, the anode terminal of a corresponding one of the first batteries and the cathode terminal of a corresponding one of the second batteries extend in a same direction.

15. The battery module of claim 14, wherein the corresponding one of the first batteries and the corresponding one of the second batteries are configured to be connected in series.

16. The battery module of claim 1, wherein the first batteries and the second batteries are cylindrical rechargeable batteries.

17. The battery module of claim 16, wherein a height from a deepest position of the first battery-containing portions to a top of corresponding ones of the connection members of the first connection member mounting portions is less than a radius of each of the first batteries and the second batteries.

18. The battery module of claim 1, further comprising a plurality of third batteries, wherein the third batteries have no anode terminals or cathode terminals for contacting the connection members and are electrically connected to each other or to the first batteries or to the second batteries by interconnectors.

19. The battery module of claim 18, wherein the third batteries are connected in series with the first batteries and the second batteries.

* * * * *